United States Patent
Dolgin (10) Patent No.: US 9,684,069 B2
(45) Date of Patent: Jun. 20, 2017

(54) HIGH ANGULAR RESOLUTION LOW FREQUENCY RADAR WITH SMALL ANTENNA AND HIGH RESOLUTION LOW FREQUENCY GROUND PENETRATING RADAR

(71) Applicant: RAYTHEON COMPANY, Waltham, MA (US)

(72) Inventor: Benjamin Dolgin, Springfield, VA (US)

(73) Assignee: RAYTHEON COMPANY, Waltham, MA (US)

( * ) Notice: Subject to any disclaimer, the term of this patent is extended or adjusted under 35 U.S.C. 154(b) by 345 days.

(21) Appl. No.: 14/592,522

(22) Filed: Jan. 8, 2015

(65) Prior Publication Data

US 2015/0198706 A1 Jul. 16, 2015

Related U.S. Application Data

(60) Provisional application No. 61/925,859, filed on Jan. 10, 2014.

(51) Int. Cl.
  *G01S 13/32* (2006.01)
  *G01S 13/88* (2006.01)
  *G01S 7/282* (2006.01)
  *G01S 13/42* (2006.01)

(52) U.S. Cl.
  CPC .............. *G01S 13/32* (2013.01); *G01S 7/282* (2013.01); *G01S 13/42* (2013.01); *G01S 13/885* (2013.01); *G01S 13/888* (2013.01)

(58) Field of Classification Search
  CPC ........ G01S 13/32; G01S 13/42; G01S 13/885; G01S 13/888; G01S 7/282

USPC ......................................................... 342/202
See application file for complete search history.

(56) References Cited

U.S. PATENT DOCUMENTS

2003/0097056 A1* 5/2003 Suzuki ............... A61B 5/04007
                                                                600/409

OTHER PUBLICATIONS http://en.wikipedia.org/wiki/Lorenz_beam, 5 pages, Dec. 31, 2014.

* cited by examiner

*Primary Examiner* — Timothy A Brainard
(74) *Attorney, Agent, or Firm* — Lewis Roca Rothgerber Christie LLP (57) ABSTRACT

A ground-penetrating radar system or other low-frequency radar system that operates at a wavelength that is comparable to or larger than the dimensions of the transmitting and receiving antennas. In one embodiment, a radar transmitter includes two drive coils, misaligned with respect to each other, that produce respective field patterns, each modulated with a respective modulation. A radar receiver includes a composite sense coil that senses the effect a target has on the fields, and generates a corresponding signal that carries the two modulations. From the proportion of the two modulations in the received signal, which depends on the extent to which the target is in each of the two field patterns, the receiver estimates the angle (e.g., the azimuth angle) to the target. An additional measurement of the angle may be made by comparing the phases of the carrier in the two received modulations. The composite sense coil may consist of two coils wired in series and configured to generate no output when the only field incident on the composite sense coil is that of the two drive coils, in the absence of a target.

20 Claims, 4 Drawing Sheets

HIGH ANGULAR RESOLUTION LOW FREQUENCY RADAR WITH SMALL ANTENNA AND HIGH RESOLUTION LOW FREQUENCY GROUND PENETRATING RADAR

CROSS-REFERENCE TO RELATED APPLICATION(S)

The present application claims priority to and the benefit of U.S. Provisional Application No. 61/925,859, filed Jan. 10, 2014, entitled "HIGH ANGULAR RESOLUTION LOW FREQUENCY RADAR WITH SMALL ANTENNA AND HIGH RESOLUTION LOW FREQUENCY GROUND PENETRATING RADAR", the entire content of which is incorporated herein by reference.

BACKGROUND

1. Field

One or more aspects of embodiments according to the present invention relate to low frequency radar systems and more particularly to a system and method for improving the angular resolution of a low frequency radar.

2. Description of Related Art

Through-the-wall radar and ground-penetrating radar (GPR) may use long-wavelength radiation (with, e.g., a wavelength of 1 m or more) with a relatively low frequency to penetrate walls or ground, allowing the radar system to detect targets such as buried objects or objects inside buildings. The angular resolution of such through-the-wall and ground-penetrating radar systems may be poor, however, unless an impractically large antenna is used, because of the long wavelengths employed. Similarly, an unmanned aerial vehicle (UAV) may have poor angular resolution in a radar system it carries, because constraints on antenna size may make it impractical to use an antenna that is much larger than the wavelength of the radar system. Thus, there is a need for a system and method for a low-frequency radar system with good angular resolution.

SUMMARY

Aspects of embodiments of the present invention are directed toward a ground-penetrating radar system or other low-frequency radar system that operates at a wavelength that is comparable to or larger than the dimensions of the transmitting and receiving antennas. In one embodiment, a radar transmitter includes two drive coils, misaligned with respect to each other, that produce respective field patterns, each modulated with a respective modulation. A radar receiver includes a composite sense coil that senses the effect a target has on the fields, and generates a corresponding signal that carries the two modulations. From the proportion of the two modulations in the received signal, which depends on the extent to which the target is in each of the two field patterns, the receiver estimates the angle (e.g., the azimuth angle) to the target. An additional measurement of the angle may be made by comparing the phases of the carrier in the two received modulations. The composite sense coil may consist of two coils wired in series and configured to generate no output when the only field incident on the composite sense coil is that of the two drive coils, in the absence of a target.

According to an embodiment of the present invention, there is provided a low-frequency radar system including: a transmitter and a receiver, the transmitter including a first drive coil and a second drive coil, the transmitter being configured to transmit: a first field pattern, having a first far-field direction and a first modulation, from the first drive coil, and a second field pattern, having a second far-field direction and a second modulation, from the second drive coil, the angle between the first far-field direction and the second far-field direction being more than 1 degree, and the modulation of the first field pattern being different from the modulation of the second field pattern, the receiver including a composite sense coil including a first sense coil and a second sense coil, the receiver being configured to: receive, with the composite sense coil, a signal resulting from the effects of a target, on the first field pattern and on the second field pattern, measure the magnitude of the first modulation in the received signal, and measure the magnitude of the second modulation in the received signal.

In one embodiment, the system includes a steering apparatus configured to steer the transmitter and the receiver.

In one embodiment, the receiver is configured to control the steering apparatus to steer the transmitter and the receiver: in the direction of the first field pattern when the magnitude of the first modulation in the received signal exceeds the magnitude of the second modulation in the received signal, and in the direction of the second field pattern when the magnitude of the second modulation in the received signal exceeds the magnitude of the first modulation in the received signal.

In one embodiment, the first field pattern has a first half-power far-field profile width and the second field pattern has a second half-power far-field profile width, and the angle between the first far-field direction and the second far-field direction is greater than 1% of the average of the first half-power far-field profile width and the second half-power far-field profile width.

In one embodiment, the angle between the first far-field direction and the second far-field direction is greater than 30% of the average of the first half-power far-field profile width and the second half-power far-field profile width and less than 100% of the average of the first half-power far-field profile width and the second half-power far-field profile width.

In one embodiment, the composite sense coil has a far-field direction, the angle between the far-field direction of the composite sense coil and the first far-field direction is less than the angle between the first far-field direction and the second far-field direction, and the angle between the far-field direction of the composite sense coil and the second far-field direction is less than the angle between the first far-field direction and the second far-field direction.

In one embodiment, the first field pattern has a first half-power far-field profile width and the composite sense coil has a half-power far-field profile width that is substantially the same as the first half-power far-field profile width.

In one embodiment, the receiver is configured to measure the magnitude of the first modulation in the received signal by: delaying the first modulation to form a delayed first modulation; demodulating the received signal to form a demodulated signal; correlating the demodulated signal with the delayed first modulation to form a correlation signal; and taking the value of the correlation signal.

In one embodiment, the first field pattern has a first half-power far-field profile width and the composite sense coil has a half-power far-field profile width that is substantially the same as the first half-power far-field profile, width.

In one embodiment, the first modulation is orthogonal to the second modulation.

In one embodiment, the first modulation is on-off modulation, and the second modulation is on-off modulation that is complementary to the first modulation.

In one embodiment, the duty cycle of the first modulation is less than 50% and the duty cycle of the second modulation is greater than 50%.

In one embodiment, the first modulation is on-off modulation with a binary code.

In one embodiment, the binary code is a pseudorandom binary code.

According to an embodiment of the present invention, there is provided a method for operating a low-frequency radar system, the method including: transmitting, by a first drive coil, a first field pattern having: a first far-field direction, and a first modulation, and transmitting, by a second drive coil, a second field pattern having: a second far-field direction, and a second modulation, and receiving a signal resulting from the effects of a target, on the first field pattern and on the second field pattern, measuring the magnitude of the first modulation in the received signal, and measuring the magnitude of the second modulation in the received signal.

In one embodiment, the first modulation is orthogonal to the second modulation.

In one embodiment, the first modulation is on-off modulation, and the second modulation is on-off modulation that is complementary to the first modulation.

In one embodiment, the duty cycle of the first modulation is less than 50% and the duty cycle of the second modulation is greater than 50%.

In one embodiment, the first modulation is on-off modulation with a binary code.

In one embodiment, the binary code is a pseudorandom binary code.

DETAILED DESCRIPTION

The detailed description set forth below in connection with the appended drawings is intended as a description of exemplary embodiments of a high angular resolution low frequency radar with small antenna and high resolution low frequency ground penetrating radar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The angular resolution of a conventional radar may be determined by the ratio of the wavelength to the diameter of the transmitting antenna, an angular resolution that may be referred to as the diffraction limit. Embodiments of the present invention are directed at improving the angular resolution of a radar, e.g., a low frequency ground penetrating radar, below the diffraction limit. Such a radar system may have applications on UAVs, through-the-wall radar, and ground penetrating radar (GPR), where the radar wavelength may be larger than the size of the equipment. In one embodiment, a low frequency radar system uses two or more antenna arrays to create radar with angular resolution that may be hundreds of times below the diffraction limit.

In one embodiment of the present invention, the radar system has an angular resolution significantly below the diffraction limit of a conventional radar. A transmitter in the radar system emits two or more misaligned but overlapping, separately modulated field patterns, a first field pattern and a second field pattern, that carry a first modulation and a second modulation, respectively. These field patterns may take the form of near-field electromagnetic fields, for targets that are not much farther than a wavelength from the radar system, or they may take the form of radiated field patterns for far-field targets, i.e., targets that are much farther than a wavelength from the radar system.

Within the region in which the field patterns overlap, the field patterns form an angular region or "overlap field pattern" in which the power of the first and second field patterns is approximately equal. This angular region may be substantially smaller (i.e., narrower) than the angular extent of either of the first and second field patterns. A far-field target, for example, in the overlap field pattern, reflects the radar radiation in each of the first field pattern and the second field pattern, and the reflected radiation is received by a radar receiver. The radar receiver measures the magnitude of the first modulation and the magnitude of the second modulation in the received signal, and infers from it whether the target is illuminated to a greater extent by the first field pattern or by the second field pattern, and estimates the direction to the target.

Figure 1:
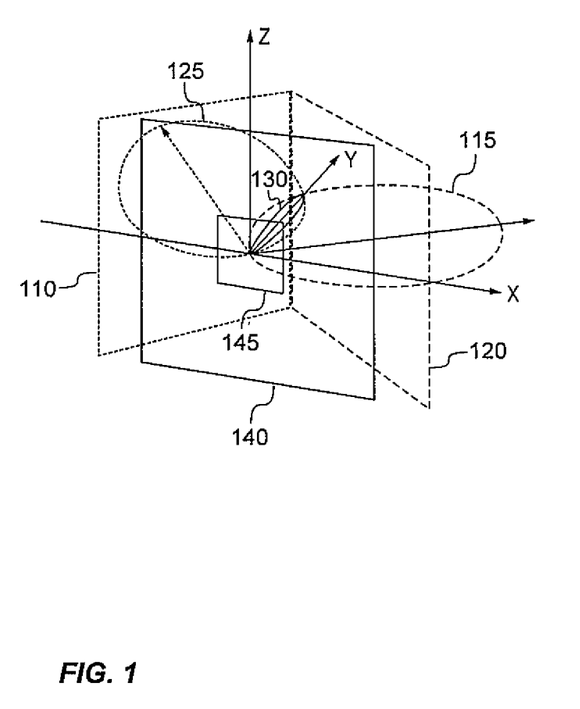
FIG. 1 is a perspective view of two drive coils and two sense coils of a low-frequency radar, according to an embodiment of the present invention.

Referring to FIG. 1, in one embodiment, a radar transceiver has a transmitter including two transmitting antennas or "drive coils", a first drive coil 110 and a second drive coil 120, that are misaligned, e.g., in azimuth as illustrated in FIG. 1. The radar system also has a receiving antenna consisting of one or more "sense coils". If the radar transmitter emits a composite field pattern including two or more overlapping field patterns, sub-diffraction-limit angular resolution may be achieved. In one embodiment, the first drive coil 110 generates a first field pattern with a primary lobe 115, the antenna pattern, or "profile" of which is shown in FIG. 1 in a perspective view of a polar plot in the X-Y plane. For nearby targets, the polar plot of the profile may represent, e.g., the square of the magnitude of the magnetic field, as a function of angle, at a fixed radius from a central reference point of the first and second drive coils. With respect to distant targets, the profile may be a conventional antenna pattern, e.g., the profile may represent the radiant intensity, i.e., the far-field power per unit solid angle, and this profile may be referred to as the "far-field profile". The polar plots illustrated in FIG. 1 are idealized for purposes of illustration and do not include side lobes. The first and second field patterns overlap, and the range of angles within which the transmitter transmits approximately the same radiant intensity in each of the field patterns may be referred to as an overlap field pattern 130. In this embodiment, each of the first field pattern 115 and the second field pattern 120 may have a width comparable to the Rayleigh diffraction limit, and, as a result, they may be relatively broad, but the overlap field pattern 130 may be significantly narrower. In FIG. 1, the first drive coil 110 and first field pattern primary lobe 115 are drawn in short-dashed lines, for identification, and the second drive coil 120 and second field pattern primary lobe 125 are drawn in long-dashed lines, also for identification.

The receiver may include a first sense coil 140 and a second sense coil 145 wired in series to form a composite sense coil that includes both the first sense coil 140 and the second sense coil 145. In one embodiment, the second sense coil 145 encloses a smaller area and has more turns than the first sense coil 140, and is tuned so that in the absence of a target, the near field signal from either of the drive coils generates voltages in the first and second sense coils in equal proportions, so that they cancel at the output of the composite sense coil. Fields resulting from reflections from a target (reflections that, in the near field, may be characterized as distortions of the near field by the target) may in general generate voltages in the first and second drive coils in unequal proportions, and therefore these voltages may not cancel. As a result, the composite sense coil does not respond to the near-field electromagnetic fields generated by either of the drive coils and responds only to reflected fields, or distortions of the fields, produced by a target. The sense coils may, for example, be tuned empirically, by adding windings to the second sense coil 145 while driving one of the drive coils, until the signal detected in the composite sense coil vanishes or becomes acceptably small. The composite sense coil may be oriented such that field distortions or reflections produced by a target in the overlap field pattern generate a significant signal in the composite sense coil. As used herein, the "effects" of a target are the changes that the target causes in the first field pattern or in the second field pattern. Thus, the "effects" of the target on the first or second field pattern include reflections of far-field radiation if the target is in the far field of the first or second field pattern, and they include distortions of the first or second field pattern if the target is in the near field of the first or second field pattern.

In a situation where the distance to the target is small (e.g., up to a dozen meters), each transmitting antenna may consist of one or more drive coils arranged in a quadrupole configuration. Since the target is in the near field of the antenna, magnetic coils may operate as if they are in quasi-static mode (constant current); a quadrupole configuration may increase the sharpness of the field magnitude as a function of angle, and, correspondingly, the power in the overlap field pattern.

Figure 2A:
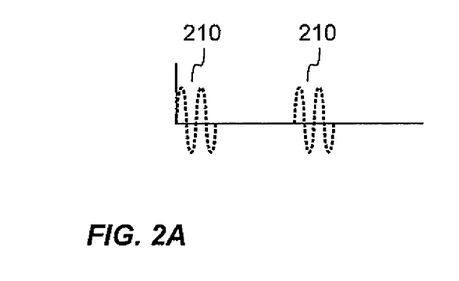
FIG. 2A is a waveform diagram illustrating a drive signal applied to a first drive coil, according to an embodiment of the present invention.
Figure 2B:
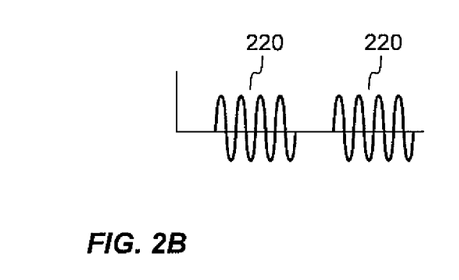
FIG. 2B is a waveform diagram illustrating a drive signal applied to a second drive coil, according to an embodiment of the present invention.

Referring to FIGS. 2A and 2B, in one embodiment, a drive signal applied to the first drive coil is modulated with a first modulation, and as a result the first field pattern 115 (FIG. 1) is also modulated with a first modulation. Similarly, the second field pattern 120 (FIG. 1) is modulated with a second modulation. For example, in a modulation scheme referred to herein as dot-dash modulation, the first modulation is on-off modulation with a duty cycle of less than 50% (i.e., "dots" 210 in FIG. 2A), and the second modulation is complementary on-off modulation, i.e., on-off modulation with a duty cycle greater than 50% (i.e., "dashes" 220 in FIG. 2B), and with a phase such that the second field pattern is off whenever the first field pattern is on, and the second field pattern is on whenever the first field pattern is off, so that one of the two field patterns is on at any time.

A target that is within only the first field pattern will reflect radar radiation from, or distort the fields of, only the first field pattern, and a target that is within only the second field pattern will reflect radar radiation from, or distort the fields of, only the second field pattern. A target that is within the overlap field pattern 130 (i.e., a target that is within both the first field pattern and the second field pattern) will reflect radar radiation from, or distort the fields of, both field patterns, in proportions depending on the target's location within the overlap field pattern 130. For example, the field received by the receiver due to a target that is nearer to the center of the first field pattern than to the center of the second field pattern may contain a greater proportion of radar radiation of the first field pattern than of the second field pattern.

Figure 3A:
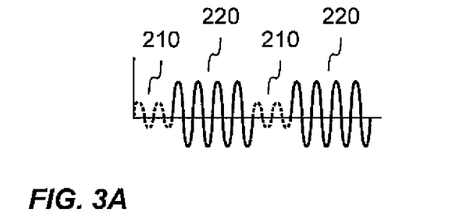
FIG. 3A is a waveform diagram illustrating received reflected radar radiation from a target in a first location, according to an embodiment of the present invention.
Figure 3B:
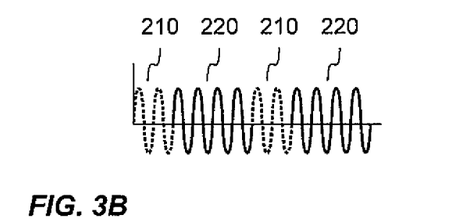
FIG. 3B is a waveform diagram illustrating received reflected radar radiation from a target in a second location, according to an embodiment of the present invention.
Figure 3C:
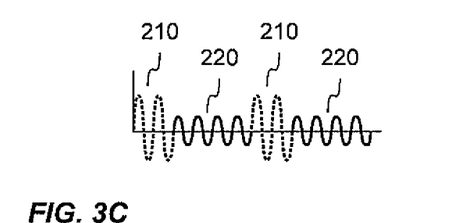
FIG. 3C is a waveform diagram illustrating received reflected radar radiation from a target in a third location, according to an embodiment of the present invention.

Thus the field received by the receiver may contain two components, a first component that is due to the target reflecting or distorting the field of the first field pattern, and a second reflected component that is due to the target reflecting or distorting the field of the second field pattern; each component carries the corresponding modulation. If the target is nearer to the center of the second field pattern than to the center of the first field pattern, for example, the field received by the receiver contains the second modulation ("dashes" 220) with a magnitude that is greater than that of the first modulation ("dots" 210), as illustrated in FIG. 3A. If the target is equally close to the center of the first field pattern and to the center of the second field pattern, the radar radiation reflected from the target contains the first modulation and the second modulation with the same magnitude, as illustrated in FIG. 3B. If the target is nearer to the center of the first field pattern than to the center of the second field pattern, the field received by the receiver contains the first modulation with a magnitude that is greater than that of the second modulation, as illustrated in FIG. 3C.

The receiver is configured to distinguish, in the field (or field distortions) it receives from the target, the first and second modulations, and to infer, from the relative magnitudes of these modulations, the direction to the target. For example, if the magnitude of the second modulation in the signal received by the receiver is slightly larger than the magnitude of the first modulation in the signal received by the receiver, the receiver may infer that the target is within the overlap field pattern 130, and that the target is offset from the center of the overlap field pattern 130 by a small angle in the direction of the second field pattern. In one embodiment, the direction to the target may be measured or estimated with a resolution 1000 times better than the diffraction limit. Thus, with two 1-foot dipole antennas it may be possible to transmit an overlap field pattern with an angular extent of less than 1 degree at wavelengths of several meters or larger (e.g., at 100 MHz) using a device that has overall dimensions of 1 foot or less. For drive coils that are misaligned in azimuth, the receiver may estimate the bearing angle (or azimuth angle) of the target from the difference between the magnitude of the first modulation in the received signal and the magnitude of the second modulation in the received signal. The angle between the center of the overlap field pattern and the target may be estimated by multiplying this difference by a scaling factor, or the estimated angle may be a different function, e.g., a nonlinear function of this difference.

The estimated direction to the target, or estimated "target angle", may also be affected by characteristics of the target. A target that has directional reflectivity or produces directional field distortions may introduce an error into the estimated angle, by producing larger or smaller reflections or distortions of the second field pattern relative to the first field pattern than it would if its characteristics were omnidirectional. In one embodiment, this error is less than, or of order, the width of the overlap field pattern 130.

The system may display the estimated target angle to an operator, or use it for subsequent processing or control, e.g., the system may track the target by continuously steering the transceiver in the direction of the target. This may be accomplished, for example, by steering the transceiver in the direction of the field pattern from which the target produces the stronger signal at the receiver. If the target is outside of the overlap field pattern 130 by a sufficiently large angle that the measured magnitude of one of the modulations is too small, in the received signal, to be distinguished from zero, then the system may discard the measurement, i.e., exclude it from further processing, or the system may steer the transceiver gradually toward the target until both modulations have a measured magnitude in the received radar radiation that significantly exceeds zero. The radar system may have a steering apparatus, such as an azimuth mount or an azimuth-elevation mount, for steering the first and second drive coils 110, 120 and the first and second sense coils 140, 145.

The first and second modulation may be selected to be orthogonal. If each of the field patterns carries a signal S that is a function of the radar carrier C and a modulation signal M so that $$S=F(C,M)$$

and $$M=F^{-1}(S,C)+\text{error}$$

where F and $F^{-1}$ are modulation and demodulation functions, and if the modulation is linear, then $$F^{-1}(F(C,M_1)+F(C,M_2))=M_1+M_2+\text{error}$$

where error is small.

Orthogonality in the time domain, as used herein, means that $$\int_{t-T}^{t} M_1 \cdot M_2 \cdot dt = 0$$

As mentioned above, the first and second modulation may be dot-dash modulation. In other embodiments, the modulations consist of on-off modulation with two 50% duty cycle modulation waveforms separated by 180 degrees, or amplitude modulation with square waves or with sine waves separated by 90 degrees, or complementary on-off modulation with a binary code, e.g., a pseudorandom binary code. In yet other embodiments, the first and second modulation may also, or instead, be orthogonal in the frequency domain or space domain, e.g., the modulations may consist of frequency modulation, or spatial modulation (e.g., the directions of the first and second field patterns may be modulated).

On-off modulation with a binary code may be employed at bit rates up to one-half of the radar carrier frequency. In a pulsed radar system, each pulse may contain a "word" of several bits of the binary code; the word may be sixteen bits in length.

In one embodiment, the receiver employs conventional radar processing to determine the range to the target. For example, if the radar operates in a pulsed mode, the receiver measures the time delay or "round trip delay" between the transmission of the pulse and the reception, at the receiver, of the pulse after reflection from the target. If the radar operates in a continuous wave (CW) mode, the radar may transmit a frequency modulated (FM) signal (modulated at high frequency) and the radar may determine the distance to the target by the phase difference between the transmitted and received signals; the round trip delay may be inferred from the distance to the target. Once the round trip delay is known, for the exemplary types of amplitude modulation listed above, the magnitude of a modulation (e.g., the first or second modulation) in the received radar radiation may then be obtained by first demodulating the received radar signal using any of several methods known to those of skill in the art, e.g., by down-converting the received radar signal to baseband. The magnitude may then be obtained by delaying the modulation by the round trip delay, correlating the delayed modulation with the demodulated received signal, and taking the value. The averaging may be performed over several pulses in a pulsed radar system. In other embodiments, the magnitudes of the first and second modulations may be measured using signal processing at an intermediate frequency (IF) instead of at baseband.

The modulations may not be perfectly orthogonal, e.g., as a result of imperfections in circuitry generating the modulations and applying them to the radar carrier, and the sensitivity of the system may be correspondingly reduced.

The profiles of the first field pattern and the second field pattern and the misalignment angle between the first field pattern and the second field pattern may be selected or adjusted for good sensitivity in the measurement of the target angle. The sensitivity may be better if each of the first field pattern and the second field pattern has a sharp edge (i.e., field strength or radiant intensity changing rapidly with angle) within the overlap field pattern 130, so that the difference between the magnitude of the first modulation and the magnitude of the second modulation in the received field pattern changes rapidly with target angle. The sensitivity may also be better if both field patterns have high radiant intensity or high field amplitudes within the overlap field pattern 130, so that the reflections or field distortions produced by the target generate a signal in the receiver that is well above the receiver noise floor. In one embodiment, the misalignment angle is 1% of the half-power far-field profile width, where the half-power far-field profile width is defined as the angle between the directions at which the far-field profile for the field pattern takes half of its peak value. The far-field direction of the field pattern is defined to be the direction corresponding to the peak of the far-field profile, i.e., the direction in which the far-field profile takes its largest value. In another embodiment, the misalignment angle is greater than 1% of the half-power far-field profile width, e.g., approximately one-half of the half-power far-field profile width. In other embodiments, the misalignment angle is greater than 1 degree, or it is between 30 degrees and 120 degrees. In one embodiment, each profile is designed to be relatively flat over a range of angles and to drop sharply on one or both sides of the flat region. The composite sense coil may have corresponding characteristics, including a far-field profile, defined as the power (normalized to the incident irradiance) at the output of the composite sense coil as a function of the angle to a distant source illuminating the composite sense coil with plane waves of constant incident irradiance. The far-field direction of the composite sense coil is defined to be the direction of the peak of the sense coil far-field profile, and the half-power far-field profile width of the composite sense coil is defined to be the angle between directions at which the sense coil far-field profile takes half of its peak value.

In one embodiment, for drive coils misaligned in azimuth, an additional measurement of the angle (e.g., the azimuth angle) of the target may be made from the difference between (i) the carrier phase difference between the drive signal applied to the first drive coil and the signal received in the composite sense coil and (ii) the carrier phase difference between the drive signal applied to the second drive coil and the signal received in the composite sense coil. For on-off modulation, the first of these phase differences may be measured while the first modulation is on, and the second of these phase differences may be measured while the second modulation is on. For example, the radar system may be rotated in azimuth by the steering apparatus until the difference between the phase differences vanishes or becomes negligibly small; at this point it may be inferred that the target is on a centerline bisecting the axes of the two drive coils. The angle measurement obtained in this manner may be combined with the angle estimate obtained from the difference in the magnitudes, in the received signal, of the first and second modulations.

Figure 4:
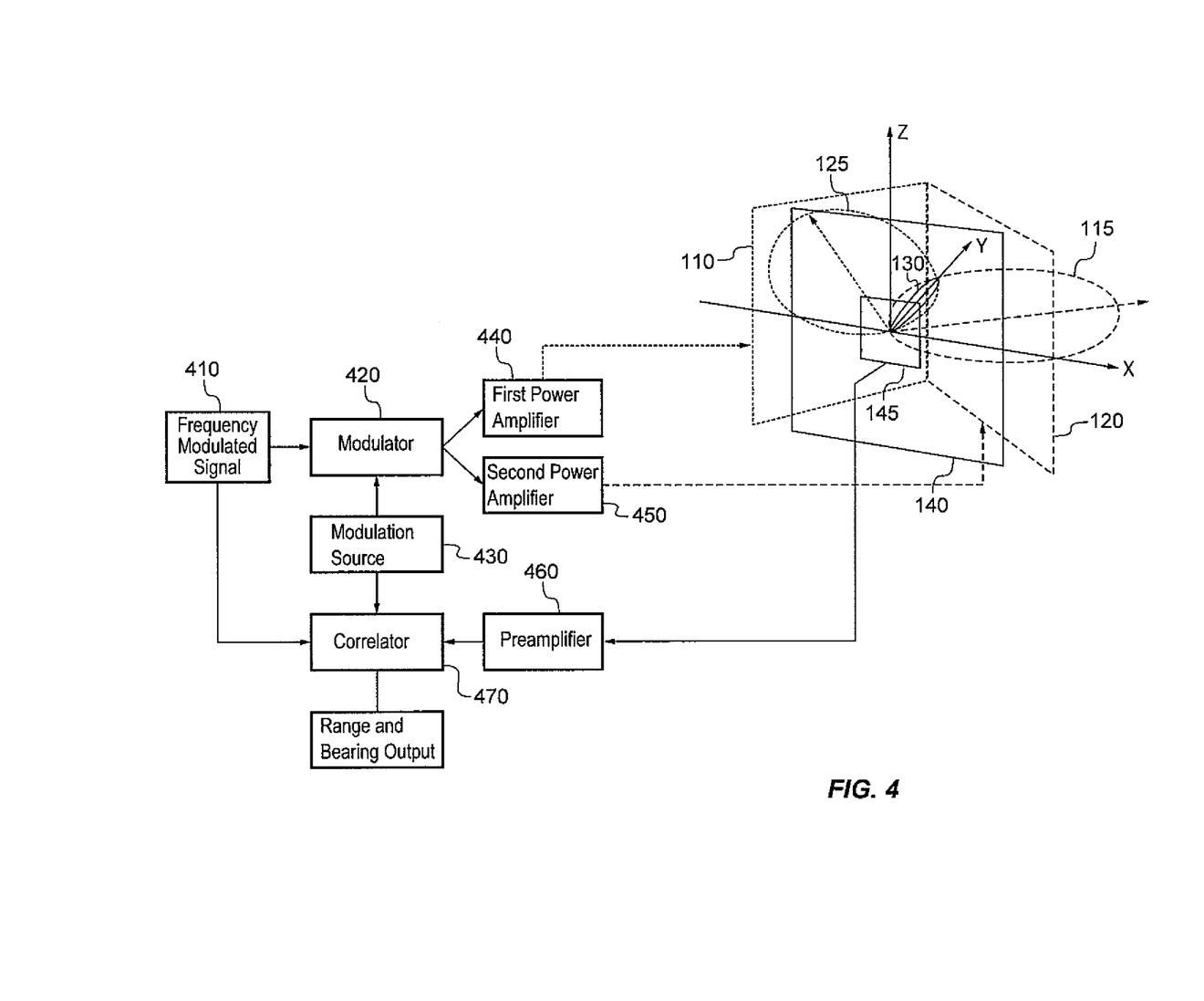
FIG. 4 is a perspective view of two drive coils and two sense coils with a block diagram of associated circuitry, according to an embodiment of the present invention.

In one embodiment, drive and sense circuitry may be constructed as shown in FIG. 4. A carrier signal generator 410 generates a frequency modulated carrier which is modulated, in a modulator 420, with amplitude modulation (AM), by two modulation signals, a first modulation and a second modulation, from a modulation source 430. The two signals are represented by the single line connecting the modulation source and the modulator in FIG. 4. The modulator produces two corresponding separately modulated outputs, which are sent, respectively, to a first power amplifier 440 and a second power amplifier 450. The first and second power amplifiers 440, 450 are connected respectively to the first and second drive coils 110, 120. The composite sense coil which includes the first sense coil 140 and the second sense coil 145 is connected to a preamplifier 460, which amplifies the received signal (generated in the composite sense coil by reflections or field distortions produced by a target) and sends it to a correlator 470. The correlator 470 measures, in the received signal, the magnitude of the first modulation and the magnitude of the second modulation, and infers from the difference between these two magnitudes the bearing angle (or azimuth angle) of the target. The correlator may also estimate the range to the target from the average of the carrier phases of the first and second received signals (i.e., the received signals carrying the first and second modulation, respectively), and the correlator may estimate the bearing angle of the target from the difference of these two phases.

A radar system according to embodiments of the present invention may be used on a UAV. Such a system may include two drive coils and a composite sense coil on a steering apparatus secured to the UAV, and it may be swept in angle until the phases of the first and second received signals are equal, or until the magnitudes of the first and second modulations in the received signal are equal, or until an angle estimate generated from both the phases and the amplitudes indicates that the target is centered with respect to the two drive coils. In such an embodiment, the angular resolution may be superior to that of a conventional radar operating at the same wavelength with antennas of a similar size to that of the coils.

In one embodiment, a third drive coil producing a third field pattern is employed to enable the system to measure two angles, e.g., bearing (or azimuth), and elevation. For example, the second field pattern may be misaligned in azimuth or bearing from the first field pattern (as illustrated in FIG. 1), and the third field pattern may be misaligned in elevation from both the first field pattern and the second field pattern. In other embodiments, the misalignments may be other combinations of azimuth and elevation misalignments. In such a system, three modulations may be applied to the three field patterns, and the three modulations may be mutually orthogonal. In one embodiment, the modulation in each field pattern is on-off modulation with a duty cycle of ⅓, and the three modulations are offset in phase by 120 degrees. In other embodiments, more than three separately modulated field patterns may be used.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially", "about", and similar terms are used as terms of approximation and not as terms of degree, and are intended to account for the inherent deviations in measured or calculated values that would be recognized by those of ordinary skill in the art.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the terms "use", "using", and "used" may be considered synonymous with the terms "utilize", "utilizing", and "utilized", respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although limited embodiments of a system and method for detection of targets using VHF radar have been specifically described and illustrated herein, many modifications and variations will be apparent to those skilled in the art. Accordingly, it is to be understood that a system and method for detection of targets using VHF radar employed according to principles of this invention may be embodied other than as specifically described herein. The invention is also defined in the following claims, and equivalents thereof.

What is claimed is:

1. A low-frequency radar system comprising:
   a transmitter and a receiver,
   the transmitter comprising a first drive coil and a second drive coil, the transmitter being configured to transmit:
     a first field pattern, having a first far-field direction and a first modulation, from the first drive coil, and
     a second field pattern, having a second far-field direction and a second modulation, from the second drive coil,
   the angle between the first far-field direction and the second far-field direction being more than 1 degree, and
   the modulation of the first field pattern being different from the modulation of the second field pattern,
   the receiver comprising a composite sense coil comprising a first sense coil and a second sense coil, the receiver being configured to:
     receive, with the composite sense coil, a signal resulting from the effects of a target on the first field pattern and on the second field pattern,
     measure the magnitude of the first modulation in the received signal, and
     measure the magnitude of the second modulation in the received signal.

2. The system of claim 1, further comprising a steering apparatus configured to steer the transmitter and the receiver.

3. The system of claim 2, wherein the receiver is configured to control the steering apparatus to steer the transmitter and the receiver:
   in the direction of the first field pattern when the magnitude of the first modulation in the received signal exceeds the magnitude of the second modulation in the received signal, and
   in the direction of the second field pattern when the magnitude of the second modulation in the received signal exceeds the magnitude of the first modulation in the received signal.

4. The system of claim 1, wherein the first field pattern has a first half-power far-field profile width and the second field pattern has a second half-power far-field profile width, and the angle between the first far-field direction and the second far-field direction is greater than 1% of the average of the first half-power far-field profile width and the second half-power far-field profile width.

5. The system of claim 4, wherein the angle between the first far-field direction and the second far-field direction is greater than 30% of the average of the first half-power far-field profile width and the second half-power far-field profile width and less than 100% of the average of the first half-power far-field profile width and the second half-power far-field profile width.

6. The system of claim 1, wherein:
   the composite sense coil has a far-field direction,
   the angle between the far-field direction of the composite sense coil and the first far-field direction is less than the angle between the first far-field direction and the second far-field direction, and
   the angle between the far-field direction of the composite sense coil and the second far-field direction is less than the angle between the first far-field direction and the second far-field direction.

7. The system of claim 1, wherein the first field pattern has a first half-power far-field profile width and the composite sense coil has a half-power far-field profile width that is substantially the same as the first half-power far-field profile width.

8. The system of claim 1, wherein the receiver is configured to measure the magnitude of the first modulation in the received signal by:
   delaying the first modulation to form a delayed first modulation;
   demodulating the received signal to form a demodulated signal;
   correlating the demodulated signal with the delayed first modulation to form a correlation signal; and
   taking the value of the correlation signal.

9. The system of claim 1, wherein the first field pattern has a first half-power far-field profile width and the composite sense coil has a half-power far-field profile width that is substantially the same as the first half-power far-field profile width.

10. The system of claim 1, wherein the first modulation is orthogonal to the second modulation.

11. The system of claim 10, wherein the first modulation is on-off modulation, and the second modulation is on-off modulation that is complementary to the first modulation.

12. The system of claim 11, wherein the duty cycle of the first modulation is less than 50% and the duty cycle of the second modulation is greater than 50%.

13. The system of claim 12, wherein the first modulation is on-off modulation with a binary code.

14. The system of claim 13, wherein the binary code is a pseudorandom binary code.

15. A method for operating a low-frequency radar system, the method comprising:
   transmitting, by a first drive coil, a first field pattern having:
     a first far-field direction, and
     a first modulation, and
   transmitting, by a second drive coil, a second field pattern having:
     a second far-field direction, and
     a second modulation, and
   receiving a signal resulting from the effects of a target on the first field pattern and on the second field pattern,
   measuring the magnitude of the first modulation in the received signal, and measuring the magnitude of the second modulation in the received signal.

16. The system of claim 15, wherein the first modulation is orthogonal to the second modulation.

17. The system of claim 15, wherein the first modulation is on-off modulation, and the second modulation is on-off modulation that is complementary to the first modulation.

18. The system of claim 17, wherein the duty cycle of the first modulation is less than 50% and the duty cycle of the second modulation is greater than 50%.

19. The system of claim 15, wherein the first modulation is on-off modulation with a binary code.

20. The system of claim 19, wherein the binary code is a pseudorandom binary code.

* * * * *